US010002345B2

(12) United States Patent
Ganani

(10) Patent No.: US 10,002,345 B2
(45) Date of Patent: Jun. 19, 2018

(54) CONFERENCING AUTO AGENDA PLANNER

(71) Applicant: AT&T Intellectual Property I, L.P., Atlanta, GA (US)

(72) Inventor: Nir Ganani, Brookline, MA (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 742 days.

(21) Appl. No.: 14/498,606

(22) Filed: Sep. 26, 2014

(65) Prior Publication Data

US 2016/0092578 A1 Mar. 31, 2016

(51) Int. Cl.
*G06F 17/30* (2006.01)
*G06Q 10/10* (2012.01)

(52) U.S. Cl.
CPC ....... *G06Q 10/10* (2013.01); *G06F 17/30528* (2013.01); *G06F 17/30699* (2013.01); *G06F 17/30867* (2013.01)

(58) Field of Classification Search
CPC ........ G06F 17/30867; G06F 17/30528; G06F 17/30699
USPC ....................................................... 707/728
See application file for complete search history.

(56) References Cited

U.S. PATENT DOCUMENTS 5,317,683 A 5/1994 Hager et al.
5,377,355 A * 12/1994 Hager .................... G06Q 10/10
707/E17.008
5,890,131 A * 3/1999 Ebert ..................... G06Q 10/04
705/7.15
6,785,681 B2 * 8/2004 Keskar .................. G06Q 30/02
7,530,021 B2 5/2009 Cheng et al.
(Continued)

FOREIGN PATENT DOCUMENTS

CN 102857997 1/2013
EP 1601219 11/2005
(Continued)

OTHER PUBLICATIONS

DEA. Room Scheduling Software. http://www.dea.com/Solutions/Software-Solutions/Room-Scheduling-Software.aspx?mi=1. Retrieved on Jul. 21, 2014. pp. 2.
(Continued)

*Primary Examiner* — Mark E Hershley
(74) *Attorney, Agent, or Firm* — Amin, Turocy & Watson, LLP

(57) ABSTRACT

To generate agendas for meetings, an agenda planning system is provided. The agenda planning system can generate suggested agenda items for scheduled meetings based on various available data, such as emails sent on the topic, previous meetings materials, subject and participants in the meeting appointment. The agenda planning system can determine the topic of the meeting based on the meeting request or calendar invitation. With the topic or subject of the meeting, the agenda planning system can then mine various resources in order to determine possible agenda items. The agenda planning system can propose potential agenda items based on agenda items in previous meetings, and perform searches through emails sent between the meeting invitees and/or participants. The email search terms can be based on the meeting topic or subject determined by the agenda planning system.

20 Claims, 10 Drawing Sheets

(56) References Cited

U.S. PATENT DOCUMENTS

| | | | |
|---|---|---|---|
| 7,679,518 B1* | 3/2010 | Pabla | G06Q 10/109 340/309.16 |
| 7,929,964 B2 | 4/2011 | Arumi et al. | |
| 7,974,871 B2 | 7/2011 | Oral et al. | |
| 7,979,097 B2 | 7/2011 | Hussain | |
| 8,078,164 B2 | 12/2011 | Ganesan | |
| 8,095,175 B2 | 1/2012 | Todd et al. | |
| 8,130,718 B2 | 3/2012 | Shaheen | |
| 8,214,748 B2 | 7/2012 | Srikanth et al. | |
| 8,223,677 B2 | 7/2012 | Mccamon | |
| 8,244,240 B2 | 8/2012 | Achlioptas et al. | |
| 8,271,025 B2 | 9/2012 | Brisebois et al. | |
| 8,275,377 B2 | 9/2012 | Nanda et al. | |
| 8,315,230 B2 | 11/2012 | Todd et al. | |
| 8,321,796 B2 | 11/2012 | Lyle et al. | |
| 8,358,975 B2 | 1/2013 | Bahl et al. | |
| 8,417,823 B2 | 4/2013 | Luna et al. | |
| 8,477,645 B2 | 7/2013 | Scherzer et al. | |
| 8,489,615 B2 | 7/2013 | Dhara et al. | |
| 8,493,931 B1 | 7/2013 | Nix | |
| 8,526,362 B2 | 9/2013 | Beattie, Jr. et al. | |
| 8,539,040 B2 | 9/2013 | Luna et al. | |
| 8,718,100 B2 | 5/2014 | Markley et al. | |
| 8,750,188 B2 | 6/2014 | Nicoara et al. | |
| 8,787,331 B2 | 7/2014 | Liu et al. | |
| 2001/0034738 A1* | 10/2001 | Cantwell | G06Q 10/10 715/255 |
| 2004/0268246 A1* | 12/2004 | Leban | G06F 17/2247 715/239 |
| 2005/0027800 A1* | 2/2005 | Erickson | H04L 12/1822 709/204 |
| 2005/0038687 A1 | 2/2005 | Galdes | |
| 2006/0046736 A1 | 3/2006 | Pering et al. | |
| 2006/0063560 A1 | 3/2006 | Herle | |
| 2006/0085449 A1* | 4/2006 | Sattler | G06F 17/30029 |
| 2006/0106872 A1* | 5/2006 | Leban | G06Q 10/109 |
| 2006/0224430 A1* | 10/2006 | Butt | G06Q 10/063116 705/7.16 |
| 2007/0288278 A1 | 12/2007 | Alexander et al. | |
| 2008/0040187 A1* | 2/2008 | Carraher | G06Q 10/109 705/7.19 |
| 2008/0065447 A1* | 3/2008 | Evanchik | G06Q 10/06314 705/7.24 |
| 2008/0113692 A1 | 5/2008 | Zhao et al. | |
| 2008/0126300 A1* | 5/2008 | Boss | G06F 17/30699 |
| 2008/0177611 A1 | 7/2008 | Sommers et al. | |
| 2009/0124284 A1 | 5/2009 | Scherzer et al. | |
| 2010/0087188 A1 | 4/2010 | Griff et al. | |
| 2010/0214943 A1 | 8/2010 | Immendorf et al. | |
| 2010/0318399 A1* | 12/2010 | Li | G06Q 10/1093 705/7.18 |
| 2011/0022714 A1 | 1/2011 | Nobukiyo | |
| 2011/0059737 A1 | 3/2011 | Brisebois | |
| 2011/0075557 A1 | 3/2011 | Chowdhury et al. | |
| 2011/0086611 A1 | 4/2011 | Klein et al. | |
| 2011/0191484 A1 | 8/2011 | Babbar et al. | |
| 2011/0191672 A1 | 8/2011 | Schodl et al. | |
| 2011/0213631 A1* | 9/2011 | Mislavsky | G06Q 10/06 705/7.11 |
| 2011/0261698 A1 | 10/2011 | Zhao et al. | |
| 2011/0289433 A1* | 11/2011 | Whalin | G06F 17/30964 715/753 |
| 2011/0306386 A1 | 12/2011 | Centoza et al. | |
| 2012/0176998 A1 | 7/2012 | Muellner et al. | |
| 2012/0191500 A1* | 7/2012 | Byrnes | G06Q 10/1095 705/7.19 |
| 2012/0252423 A1 | 10/2012 | Brisebois et al. | |
| 2012/0258674 A1 | 10/2012 | Livet et al. | |
| 2013/0006693 A1* | 1/2013 | Haynes, III | G06Q 10/1095 705/7.23 |
| 2013/0006695 A1 | 1/2013 | Haustein et al. | |
| 2013/0029708 A1 | 1/2013 | Fox et al. | |
| 2013/0065562 A1 | 3/2013 | Singh | |
| 2013/0065585 A1 | 3/2013 | Pelletier et al. | |
| 2013/0100944 A1 | 4/2013 | Kwon et al. | |
| 2013/0111038 A1 | 5/2013 | Girard | |
| 2013/0117060 A1* | 5/2013 | Henriksen | G06Q 10/06 705/7.21 |
| 2013/0144619 A1* | 6/2013 | Lord | G06F 3/165 704/235 |
| 2013/0144672 A1 | 6/2013 | Chakra et al. | |
| 2013/0182625 A1 | 7/2013 | Kuehnel et al. | |
| 2013/0263020 A1* | 10/2013 | Heiferman | H04L 51/32 715/753 |
| 2013/0290059 A1 | 10/2013 | Troiani | |
| 2013/0322401 A1 | 12/2013 | Visuri et al. | |
| 2013/0337814 A1 | 12/2013 | Wong et al. | |
| 2014/0035949 A1* | 2/2014 | Singh | G06Q 10/109 345/629 |
| 2014/0045498 A1 | 2/2014 | Choi et al. | |
| 2014/0078896 A1 | 3/2014 | Prytz et al. | |
| 2014/0082100 A1* | 3/2014 | Sammon | G06Q 10/101 709/206 |
| 2014/0098796 A1 | 4/2014 | Xue et al. | |
| 2014/0105003 A1 | 4/2014 | Austin et al. | |
| 2014/0108085 A1* | 4/2014 | Henriksen | G06Q 10/109 705/7.19 |
| 2014/0123032 A1* | 5/2014 | Lanz | G06Q 10/10 715/753 |
| 2014/0149166 A1 | 5/2014 | Henriksen et al. | |
| 2014/0164919 A1* | 6/2014 | Ikeda | G06F 3/0484 715/705 |
| 2014/0200944 A1* | 7/2014 | Henriksen | G06Q 10/1095 705/7.19 |
| 2014/0328190 A1 | 11/2014 | Lord et al. | |
| 2015/0009963 A1 | 1/2015 | Yang et al. | |
| 2015/0120440 A1* | 4/2015 | Jung | G06Q 30/0253 705/14.51 |
| 2015/0149182 A1* | 5/2015 | Kalns | G10L 15/18 704/275 |
| 2015/0271729 A1 | 9/2015 | Sirotkin et al. | |
| 2015/0294220 A1* | 10/2015 | Oreif | G06N 5/04 706/12 |
| 2016/0037442 A1 | 2/2016 | Chen | |

FOREIGN PATENT DOCUMENTS

| | | |
|---|---|---|
| EP | 1839456 | 10/2007 |
| EP | 2355581 | 8/2011 |
| EP | 2603046 | 6/2013 |
| EP | 2645783 | 10/2013 |
| WO | 0116816 A1 | 3/2001 |
| WO | 03041033 A2 | 5/2003 |
| WO | 2012121757 | 9/2012 |
| WO | 2012149954 | 11/2012 |
| WO | 2013043869 | 3/2013 |

OTHER PUBLICATIONS

Etouches. Event Management Software. https://www.etouches.com/ehome/etouches/videotour/. Retrieved on Jul. 20, 2014. pp. 2.

Event Pilot. Online Itinerary Planner. http://ativsoftware.com/eventpilot-conference-app-features/online-itinerary-planner/. Retrieved on Jul. 20, 2014 pp. 2.

Ganttic. Swiss Army Knife for Resource Planning, http://www.ganttic.com/. Retrieved on Jul. 21, 2014. pp. 3.

McCowan Iain. Automatic Analysis of Multimodal Group Actions in Meetings. IEEE Transactions on Pattern Analysis and Machine Intelligence. vol. 27, p. 305-317. Retrieved on Jul. 23, 2014.

Watanabe, et al., "Radio Network Selection Scheme Notified by the Each Network's Real-time Performance in the Multilayered Communication Network," 2012 15th International Symposium on Wireless Personal Multimedia Communications (WPMC), pp. 169-171.

Alkhawlani et al., "Intelligent Radio Network Selection for Next Generation Networks," 2010 The 7th International Conference on Informatics and Systems (INFOS), 2010, 7 pages.

Luo, et al., "Optimal Channel Access for TCP Performance Improvement in Cognitive Radio Networks: A Cross-Layer Design

(56) References Cited

OTHER PUBLICATIONS

Approach," IEEE Global Telecommunications Conference, 2009, 6 pages.
Samdanis, et al., "Traffic Offload Enhancements for eUTRAN," IEEE Communications Surveys & Tutorials, vol. 14, No. 3, Third Quarter 2012, pp. 884-896.
Sethi, "Building (Network) Bridges: Small Cell and Wi-Fi Convergence." www.qca.qualcomm.com, Aug. 28, 2012. http://www.qca.qualcomm.com/thewire/building-network-bridges-small-cell-and-wifi-convergence/. Retrieved on Jul. 24, 2014, 5 pages.
Architecture for Mobile Data Offload over Wi-Fi Access Networks. White Paper, www.cisco.com http://www.cisco.com/c/en/us/solutions/cdlateral/service-provider/serviceprovider-wi-h/white_paper_c11-701018.html. Retrieved on Jul. 24, 2014, 23 pages.
Dimatteo, et al. "Cellular traffic offloading through WiFi networks." Mobile Adhoc and Sensor Systems (MASS), 2011 IEEE 8th International Conference, IEEE, 2011. http://hub.hku.hk/bitstream/10722/158754/1/Content.pdf?accept=1. Retrieved on Jul. 24, 2014, 11 pages.
Bahl, et al. "Reconsidering wireless systems with multiple radios." ACM SIGCOMM Computer Communication Review 34.5 (2004): 39-46. http://research.microsoft.com/en-us/um/people/bahl/Papers/pdf/MultiRadio.pdf?0sr=ar. Retrieved on Jul. 24, 2014, 8 pages.
Balasubramanian, et al. "Energy consumption in mobile phones: a measurement study and implications for network applications." Proceedings of the 9th ACM SIGCOMM conference on Internet measurement conference, ACM, 2009. http://hph16.uwaterloo.ca/~bshihada/S13-344/papers/tailender-imc09.pdf. Retrieved on Jul. 24, 2014, 14 pages.
Office Action dated Apr. 22, 2015 for U.S. Appl. No. 14/018,045, 33 pages.
Office Action dated Sep. 10, 2015 for U.S. Appl. No. 14/018,045, 25 pages.
International Search Report for PCT Application No. PCT/US2014/053562 dated Jan. 8, 2015, 10 pgs.
Office Action dated Apr. 20, 2016 for U.S. Appl. No. 14/494,487, 58 pages.
Office Action dated Mar. 11, 2016 for U.S. Appl. No. 14/018,045, 27 pages.
Office Action dated Nov. 8, 2016 for U.S. Appl. No. 14/494,487, 40 pages.
Office Action dated Mar. 10, 2017 for U.S. Appl. No. 14/494,487, 37 pages.
Office Action dated Apr. 10, 2018 for U.S. Appl. No. 15/284,988, 41 pages.

* cited by examiner

CONFERENCING AUTO AGENDA PLANNER

TECHNICAL FIELD

The subject disclosure relates to agenda planning, and, more specifically, to generating agenda items for meetings.

BACKGROUND

Modern professionals often have multiple meetings per day. These meetings can be planned in advance and include agenda items to allow participants to prepare for the meetings. Meetings without an agenda can be ineffective and waste the participants' time. Due to time pressures, however, participants or meeting hosts often don't have time to generate agendas for each meeting they conduct or in which they participate.

DETAILED DESCRIPTION

Figure 1:
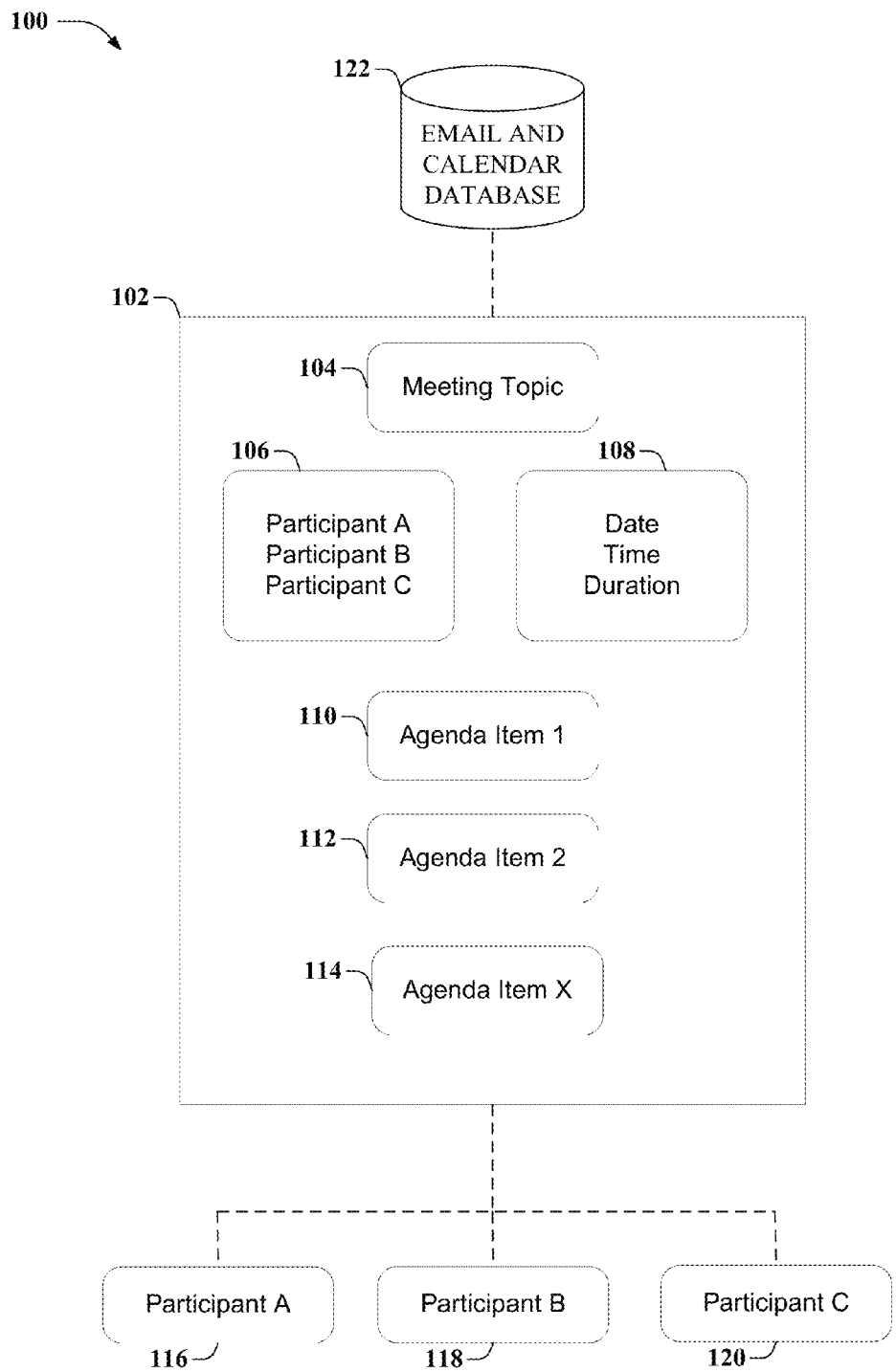
FIG. 1 is an example, non-limiting embodiment of a block diagram showing a meeting agenda in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

To generate agendas for meetings, an agenda planning system is provided. The agenda planning system can generate suggested agenda items for scheduled meetings based on various available data, such as emails sent on the topic, previous meetings materials, subject and participants in the meeting appointment. The agenda planning system can determine the topic of the meeting based on the meeting request or calendar invitation. With the topic or subject of the meeting, the agenda planning system can then mine various resources in order to determine possible agenda items. The agenda planning system can propose potential agenda items based on agenda items in previous meetings, and perform searches through emails sent between the meeting invitees and/or participants. The email search terms can be based on the meeting topic or subject determined by the agenda planning system.

The agenda planning system can filter and/or rank the potential agenda items based on relevancy, and then propose the potential agenda items to one or more of the meeting host or participants. The host or participants can select the appropriate agenda items to include in the meeting agenda, and based on the feedback, the agenda planning system can adapt or learn.

The agenda planning system disclosed herein is an improvement on conventional computing devices that perform scheduling tasks. Computing devices performing scheduling tasks can make possible what human beings cannot ordinarily do on their own by keeping track of schedule and agendas with a high level of precision, and speed that far exceeds cognitive capabilities of human beings. Conventional computerized systems are not able, however, to generate and/or suggest agenda items for requested meetings based on various available data stored in email and calendar databases. Accordingly then, the various embodiments of the agenda planning system provided herein are a clear improvement on what other computerized scheduling systems have failed to do.

For these considerations as well as other considerations, in one or more embodiments, a system includes a processor and a memory to store executable instructions that when executed by the processor, facilitate performance of operations, including determining subject data representing a subject for a requested meeting. The operations also comprise determining a set of possible agenda items for the requested meeting based on a result of an email word search associated with the subject, wherein the email search searches emails relating to an attendee identity associated with the requested meeting. The operations further comprise generating agenda data representing an agenda for the requested meeting with an agenda item selected from the set of possible agenda items, wherein the agenda item satisfies a defined criterion associated with relevancy to the subject.

In another embodiment, a method can comprise receiving, by a device comprising a processor, an indication that a meeting has been requested and receiving attendee identity data associated with the meeting. The method can also include determining, by the device, topic data representing a topic for the meeting based on a subject of the meeting. The method can also include determining, by the device, a set of possible agenda items for the meeting based on a result of an email word search associated with the topic, wherein the email search searches emails sent to and received from an attendee identity associated with the attendee identity data. The method can also include generating, by the device, agenda data representing an agenda for the meeting with an agenda item selected from the set of possible agenda items, wherein the agenda item satisfies a defined criterion associated with relevancy to the topic.

In another embodiment, a computer-readable storage device storing executable instructions that, in response to execution, cause a system comprising a processor to perform operations. The operations can include receiving an indication that a meeting has been requested and receiving attendee identity data associated with the meeting and determining topic data representing a topic for the meeting based on a subject of the meeting. The operations can further include determining a set of possible agenda items for the meeting based on a result of an email word search associated with the topic, wherein the email search searches emails related to an attendee identity associated with the attendee identity data. The operations can further include generating agenda data representing an agenda for the meeting with an agenda item selected from the set of possible agenda items, wherein the agenda item is determined to satisfy a defined criterion associated with relevancy to the topic.

Turning now to FIG. 1, illustrated is an example, non-limiting embodiment of a block diagram 100 showing a meeting agenda in accordance with various aspects described herein. The meeting agenda 102 can be stored in an email and/or calendar database 122 that is associated with one or more of the participants 116, 118, or 120. If participants 116, 118, and 120 belong to a same network or share an email server, the meeting agenda 102 can be stored in a single location. If one or more of the participants 116, 118, or 120 belong to a separate network or have a different email server, the meeting agenda can be stored in the multiple email or calendar databases. In an embodiment, the email or calendar database 122 can be stored on a local device associated with one of the participants 116, 118, or 120.

The meeting agenda 102 can include a meeting topic 104. The meeting topic 104 can be the title of the meeting as set by the meeting host or one of the participants or can be a subject of the meeting as determined by the agenda planning system (shown in more detail in FIGS. 4 and 5). The meeting agenda 102 can also include a participant list 106 that lists the participants (e.g., participants 116, 118, and 120) and/or invitees to the meeting. An invitee can be added to the list of participants 106 when the invitee accepts the invitation to attend the meeting. The meeting agenda can also include scheduling information 108 that provides information about the date, time, duration, and other related scheduling information associated with the meeting agenda 102.

The meeting agenda 102 can also include agenda items 110, 112, and 114 that collectively comprise the agenda for the meeting agenda 102. These agenda items can include topics to discuss during the meeting, and also include indications of duration, timing, ranking, order, and etc.

Figure 2:
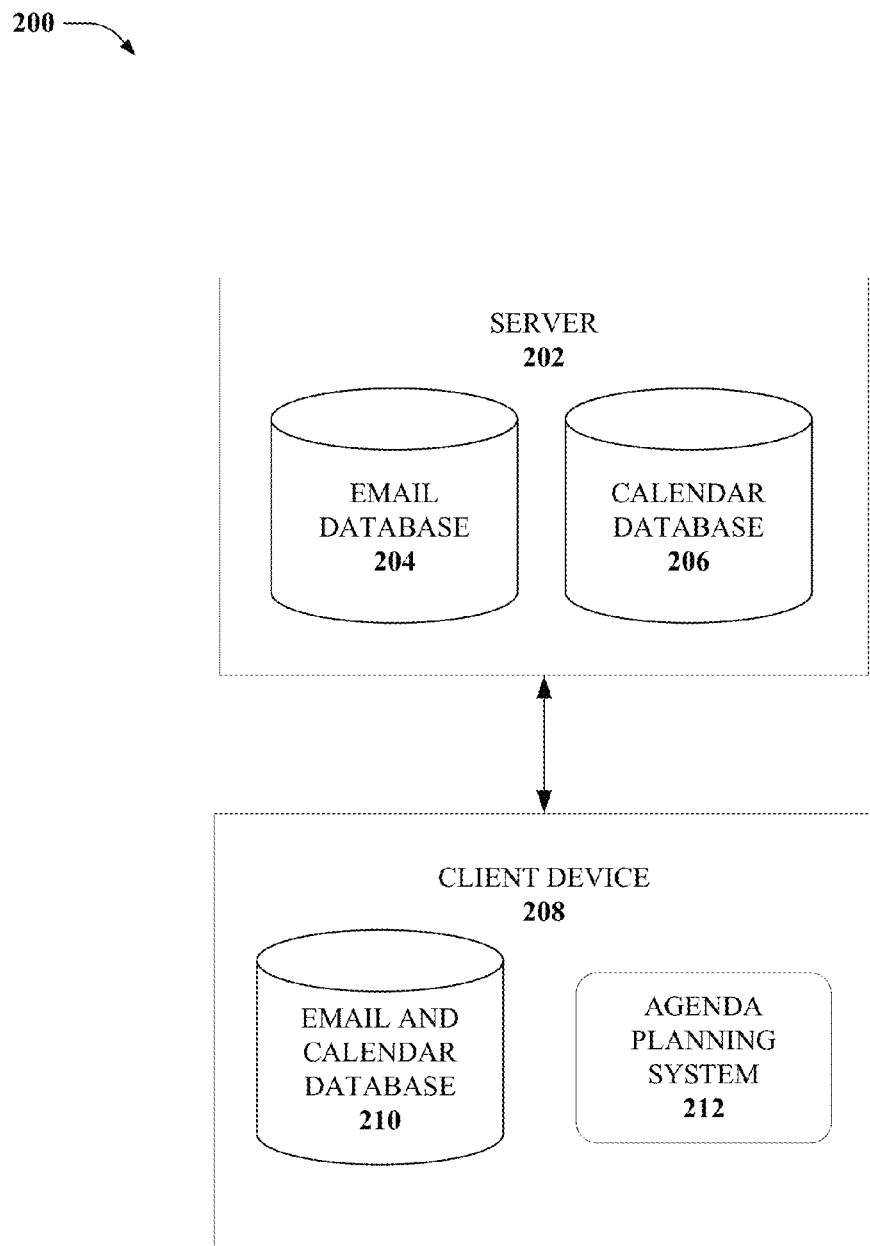
FIG. 2 is an example, non-limiting embodiment of a block diagram showing an agenda planning system in accordance with various aspects described herein.

Turning now to FIG. 2, illustrated is a block diagram 200 showing an agenda planning system 212 in accordance with various aspects described herein. In the embodiment shown in FIG. 2, an email database 204 and a calendar database 206 are stored on a server 202. A client device 208 includes an agenda planning system 212 and an email and calendar database 210. The agenda planning system 212 can generate agenda items (e.g., agenda items 110, 112, and 114) for a requested meeting based on various data available in the email database 204 and calendar database 206 on the server 202 and the email and calendar database 210 stored on the client device 208. The agenda planning system 212 can generate agenda items from previous meetings that were marked as needing further discussion, and other sources of information other than email database 204 and calendar database 206.

The agenda planning system 212 can generate the agenda items based on email searches using keywords associated with the requested meeting or associated with the meeting topic, subject, or title. The agenda planning system 212 can also generate the agenda items based on the meeting participants or invitees, and previous meeting agenda items or summaries stored in the calendar database and/or other databases.

In an embodiment, the agenda planning system 212 can retrieve the various data to generate agenda items from email database 204 and calendar database 206 without retrieving data from email and calendar database 210. In other embodiments, agenda planning system 212 can retrieve the various data to generate agenda items from email and calendar database 210 and not from email database 204 and calendar database 206. In other embodiments, various combinations of the foregoing retrievals are possible. It is also to be appreciated that email database 204 and calendar database 206 are shown as separate databases, while email and calendar database 210 is shown as a single database for exemplary reasons. In other embodiments, the various databases can be combined or separate in both the server 202 and client device 208.

In an embodiment, the server 202 can reside in the cloud, or can be an email server hosted by a network associated with the client device 208. The client device 208 can be a computing device that is networked with other client devices belonging to other users. In an embodiment, the client device 208 can also be a mobile device (e.g., mobile device 1075).

Figure 3:
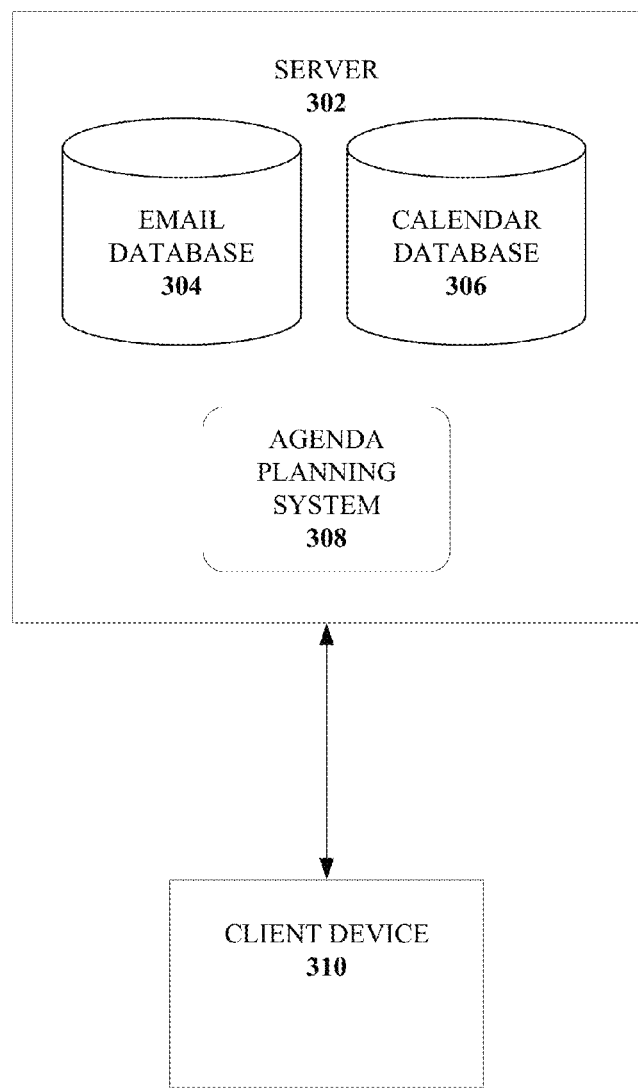
FIG. 3 is an example, non-limiting embodiment of a block diagram showing an agenda planning system in accordance with various aspects described herein.

Turning now to FIG. 3, illustrated is a block diagram 300 showing an agenda planning system 308 in accordance with various aspects described herein. In the embodiment shown in FIG. 3, an email database 304 and a calendar database 306 are stored on a server 302 along with the agenda planning system 308. When the agenda planning system 308 receives a meeting request from a client device 310, the agenda planning system 308 can generate agenda items (e.g., agenda items 110, 112, and 114) for a requested meeting based on various data available in the email database 304 and calendar database 306 on the server 302. Client device 310 can also include an email or calendar database (e.g., 210), and the agenda planning system 308 can retrieve data from the client device 310.

Figure 4:
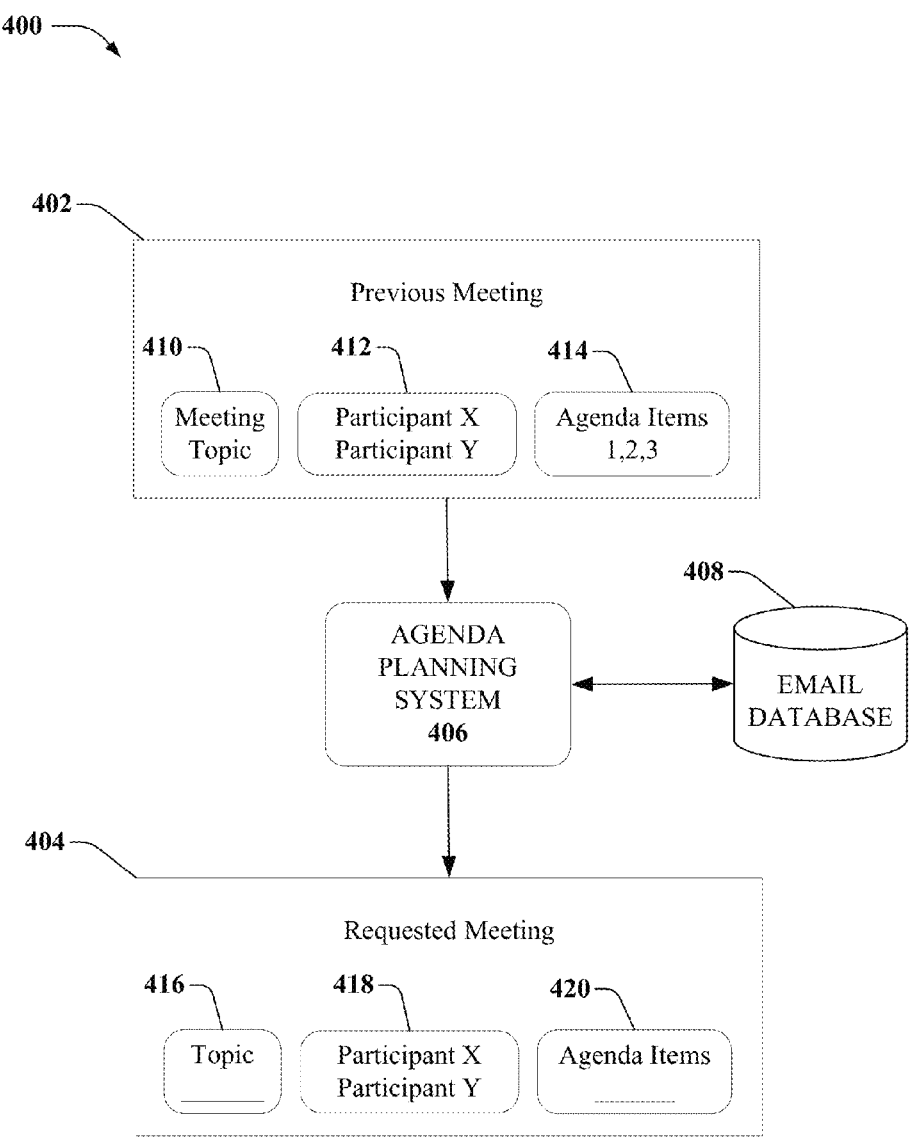
FIG. 4 is an example, non-limiting embodiment of a block diagram showing an agenda planning system in accordance with various aspects described herein.

Turning now to FIG. 4, illustrated is a block diagram 400 showing an agenda planning system 406 in accordance with various aspects described herein. The agenda planning system 406 can generate agenda items for a requested meeting 404 based on information associated with a previous meeting 402.

Agenda planning system 406 can receive an indication of a requested meeting 404, and based on information about the requested meeting such as the invited participants, meeting topic, date, time, etc, the agenda planning system 406 can determine whether the meeting is a secondary meeting, a follow up meeting, or one meeting in a series of meetings. If the requested meeting 404 is associated with one or more previous meetings (e.g., previous meeting 402), the agenda planning system 406 generate agenda items 420 for the requested meeting 404 based on agenda items 414 in one or more of previous meetings 402.

In determining whether or not the requested meeting 404 is related to previous meeting 402, the agenda planning system 406 can look at the meeting topic 410 and participant list 412 of previous meeting 402 and compare them to the meeting topic 416 and invitee/participant list 418 of the requested meeting 404. In an embodiment, agenda planning system 406 can also determine the topic 416 of the requested meeting 404 based on the meeting topic 410 of previous meeting 402. To supplement the agenda items 420 in requested meeting 404, the agenda planning system 406 can search through emails stored in email database 408, where the emails are associated with the previous meeting 402. Agenda planning system 406 can search through the email database 408 using keyword searches with keywords based on agenda items 414 from previous meeting 402. Agenda planning system 406 can also limit the keyword search to email sent to or from one or more of the participants 412 or invitees 418.

In an embodiment, the agenda planning system 406 can learn about the requested meeting 404 and previous meeting 402 based on a calendar database (e.g., calendar database 206). In an embodiment, the calendar database can be integrated into the email database 408, or can be a separate database. It is to be appreciated however that the agenda planning system 406 can learn about the requested meeting 404 and previous meeting 402 from databases other than calendar and email databases. Other databases or sources of information can be used by the agenda planning system 406 when generating potential agenda items.

Figure 5:
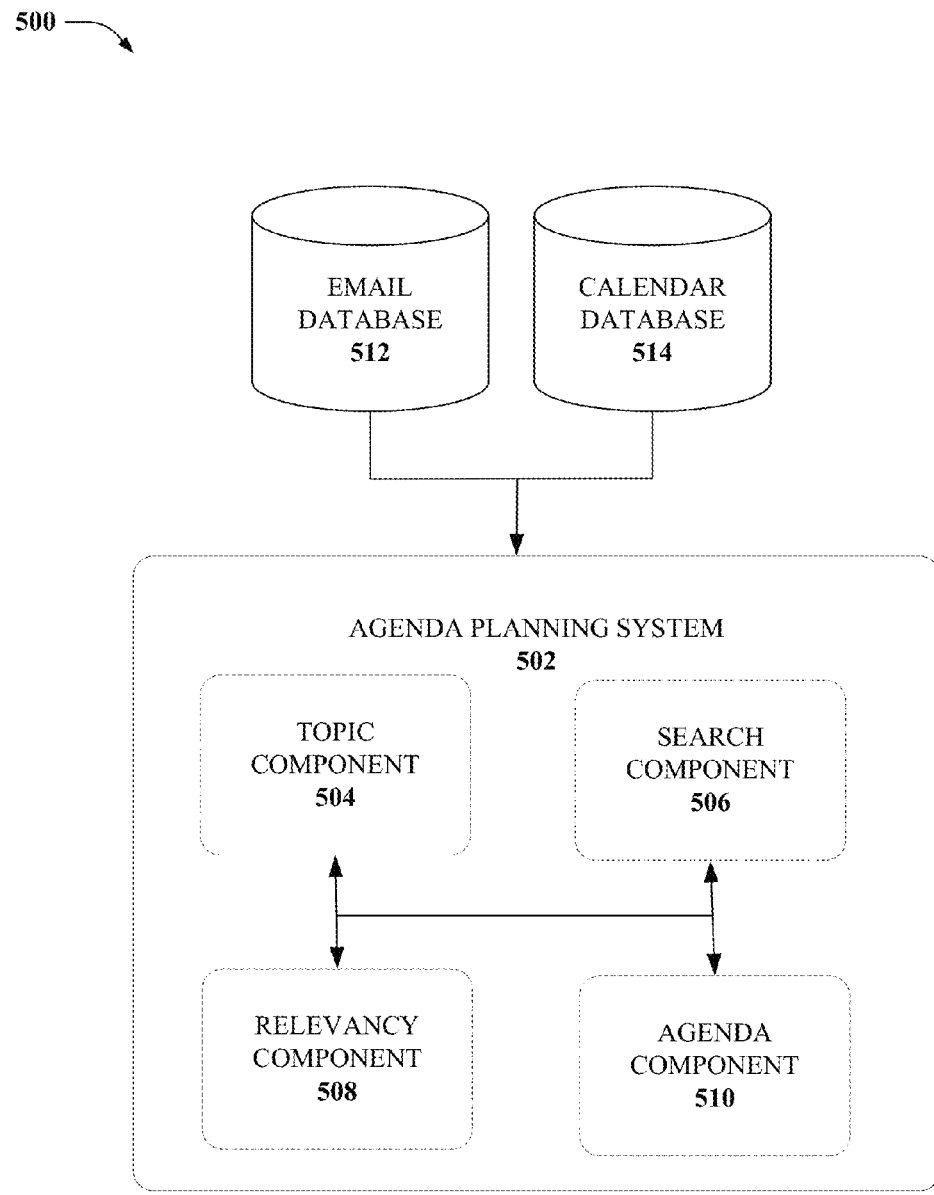
FIG. 5 is an example, non-limiting embodiment of a block diagram showing an agenda planning system in accordance with various aspects described herein.

Turning now to FIG. 5, illustrated is a block diagram 500 showing an agenda planning system 502 in accordance with various aspects described herein. Agenda planning system 502 can generate agenda items for a requested meeting based on various information that can be found in email database 512 and calendar database 514.

The agenda planning system 502 can include a topic component 504 that analyzes a requested meeting to determine subject data representing a subject for the requested meeting. The subject, or topic, of the meeting can be information identifying or summarizing the content of the meeting. In an embodiment, the topic component 504 can determine the topic or subject of the requested meeting based on the title of the meeting. If there is no title to the meeting, topic component 504 can determine the topic of the meeting based on other factors such as determining whether the meeting is related to a previous meeting. Topic component 504 can determine that the meeting is related to a previous meeting based on the invitee or participant list and compare it to participants of the previous meetings.

Similarly, topic component 504 can look at when the requested meeting was scheduled, and determine whether it is related to other meetings scheduled at similar times. For instance if a requested meeting was scheduled for 10 am on a Monday morning with a set of participants, topic component 504 can retrieve information from calendar database 514 about other meetings, and determine that if one or more other meetings were scheduled at 10 am on previous Mondays, with the same set of participants, then the requested meeting is related, and thus likely to have a similar subject or topic.

Once a topic or subject of the requested meeting is determined, a search component 506 can be provided to conduct a keyword search in email database 512 to determine possible agenda items for the requested meeting. The keyword search can be based on keywords that are associated with the subject or topic of the requested meeting. The search component 506 can search through emails that are sent to or received from one or more of the participants or invitees associated with the requested meeting. The search component 506 can also time limit the emails that are searched so that only emails sent after the previous meeting, or within a certain timeframe of the requested meeting, are searched. While search component 506 can search for emails that are outside of the bounds set by the participant list, and the time frame, in embodiments where these bounds are enacted, the agenda planning system 502 can have a more efficient search and agenda item generation process.

Relevancy component 508 can determine a relevancy of the possible agenda items discovered by the search component 506. The relevancy can be based on the similarity of the agenda items to the agenda topic or subject, or can also be based on similarity/continuity of agenda items from previous meetings. For instance, if an agenda item from a previous meeting is similar to a possible agenda item as discovered by the search component 506, then the relevancy of the possible agenda item can be high. Relevancy component 508 can also track and log the number of times one or more agenda items or keywords appear in emails associated with the requested meeting. If the agenda item and/or keyword appear more frequently than other possible agenda items, that agenda item can be assigned a higher relevancy score.

The agenda component 510 can be provided to generate agenda data representing an agenda for the requested meetings, with at least one agenda items selected from the set of possible agenda items wherein the agenda item satisfies a defined criterion associated with relevancy to the subject. The agenda component 510 can also select a plurality of agenda items that have a relevancy score matching a predetermined threshold, and generate the agenda based on these selected agenda items.

In an embodiment, the agenda component 510 can also determine an amount of time to dedicate to the agenda item based on a determined importance of the agenda item. The importance of the agenda item can be determined based on a variety of factors, including, but not limited to similarity of the agenda item to the agenda topic or subject, keyword occurrence, the number of emails in which the keyword associated with the agenda item can be found, and the number of times the agenda item appeared in previous agendas. For instance, if an agenda item has recurred in one or more previous meetings, that agenda item can be determined to be more important than other agenda items, all other things being equal. Additionally, if the agenda item has been discussed multiple times in one or more emails, or has been discussed in many emails, than the importance of the agenda item can be determined to be high.

In other embodiments, the agenda component 510 can determine the amount of time to allot to each agenda item based on indications of desired time as determined by the search component 506. For instance, if an email sent from one participant to another, stated that they wished to discuss agenda item A for 20 minutes, then agenda component 510 can use that to allot 20 minutes to agenda item A.

The agenda component 510 can also order the agenda items in the requested meeting based on the determined importance of the agenda items. In some embodiments, the most important agenda items can be discussed first, while in other embodiments, the more important agenda items can be discussed later than less important agenda items. In other embodiments, the ordering of the agenda items can be based on the allotted time for each agenda item. In other embodiments, the agenda items can be ordered based on a chronological order of appearance of the agenda items in the email word search associated with the subject. For instance, if agenda item X was discussed over email on a first day, and agenda item Y was discussed in an email sent on a second day or at a later time than the first email, then agenda item X can be ranked before agenda item Y.

Figure 6:
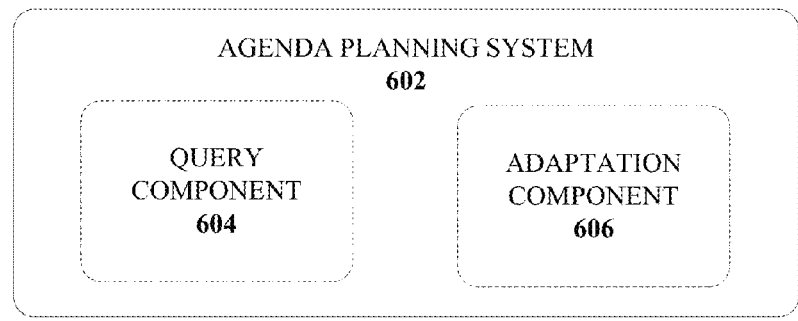
FIG. 6 is an example, non-limiting embodiment of a block diagram showing an agenda planning system that uses user feedback in accordance with various aspects described herein.

Turning now to FIG. 6, illustrated is a block diagram 600 showing an agenda planning system 602 that uses user feedback in accordance with various aspects described herein. Agenda planning system 602 can generate a suggested agenda with suggested agenda items for a user to select and choose from. This agenda item can be provided to the user via a client device (e.g., computer 902 or mobile device 1075). The computer 902 or mobile device 1075 can be used by the user to enter feedback, selecting agenda items or approving the suggested agenda, and based on the feedback received by the agenda planning system 602, the agenda can be modified and/or adapted.

Query component 604 can be provided to generate query data representing a query associated with selection of the agenda items. For instance, once agenda component 510 generates a list of agenda items, query component 604 can generate a query to deliver to the user suggesting the agenda items generated by agenda component 510. The user can select whether or not he or she approves of the agenda items, either in bulk, or separately, and then the query component 604 can receive the query response data that indicates approval or refusal of inclusion of the agenda item in the agenda of the requested meeting. If the agenda items are approved, the agenda items will be added to the requested meeting, but if one or more of the agenda items are refused, then another agenda item can be selected and offered for inclusion. The next agenda item selected after refusal of the prior agenda item, can be the next agenda item in importance or determined relevancy as determined by the relevancy component 508.

Adaptation component 606 can be provided to analyze the feedback received from the user so that the agenda planning system 602 can learn from the feedback and make better selections. If the user feedback indicates that a certain type of agenda items tends not to be approved, or that certain agenda items are not discussed when one or more selected participants are present, then adaptation component 606 can generate rules based on these learned behaviors and agenda component 510 can use these rules when selected new agenda items. Adaptation component 606 can also adjust the defined criterion associated with relevancy based on the feedback received.

Figure 7:
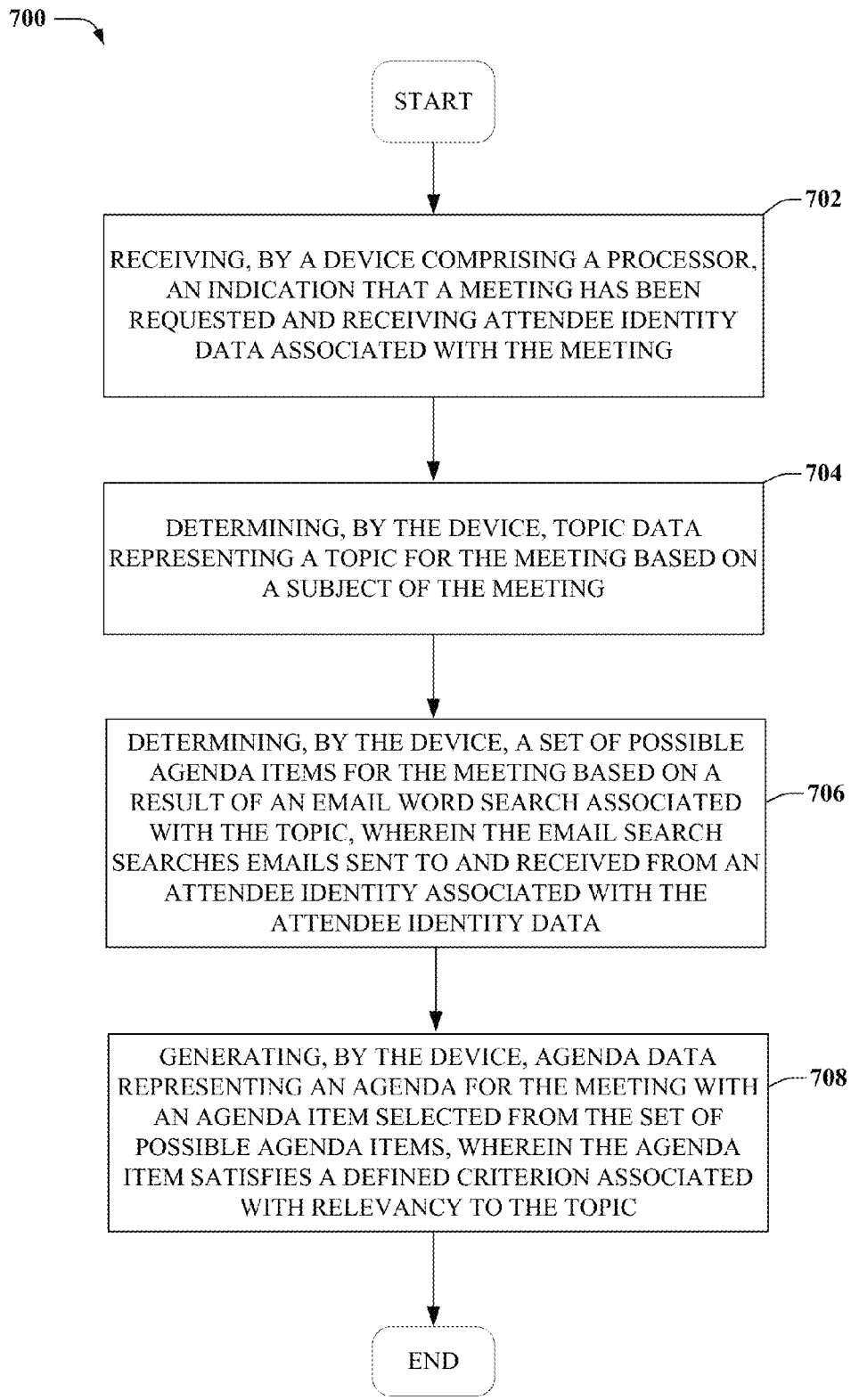
FIG. 7 illustrates a flow diagram of an example, non-limiting embodiment of a method for generating agenda items as described herein.
Figure 8:
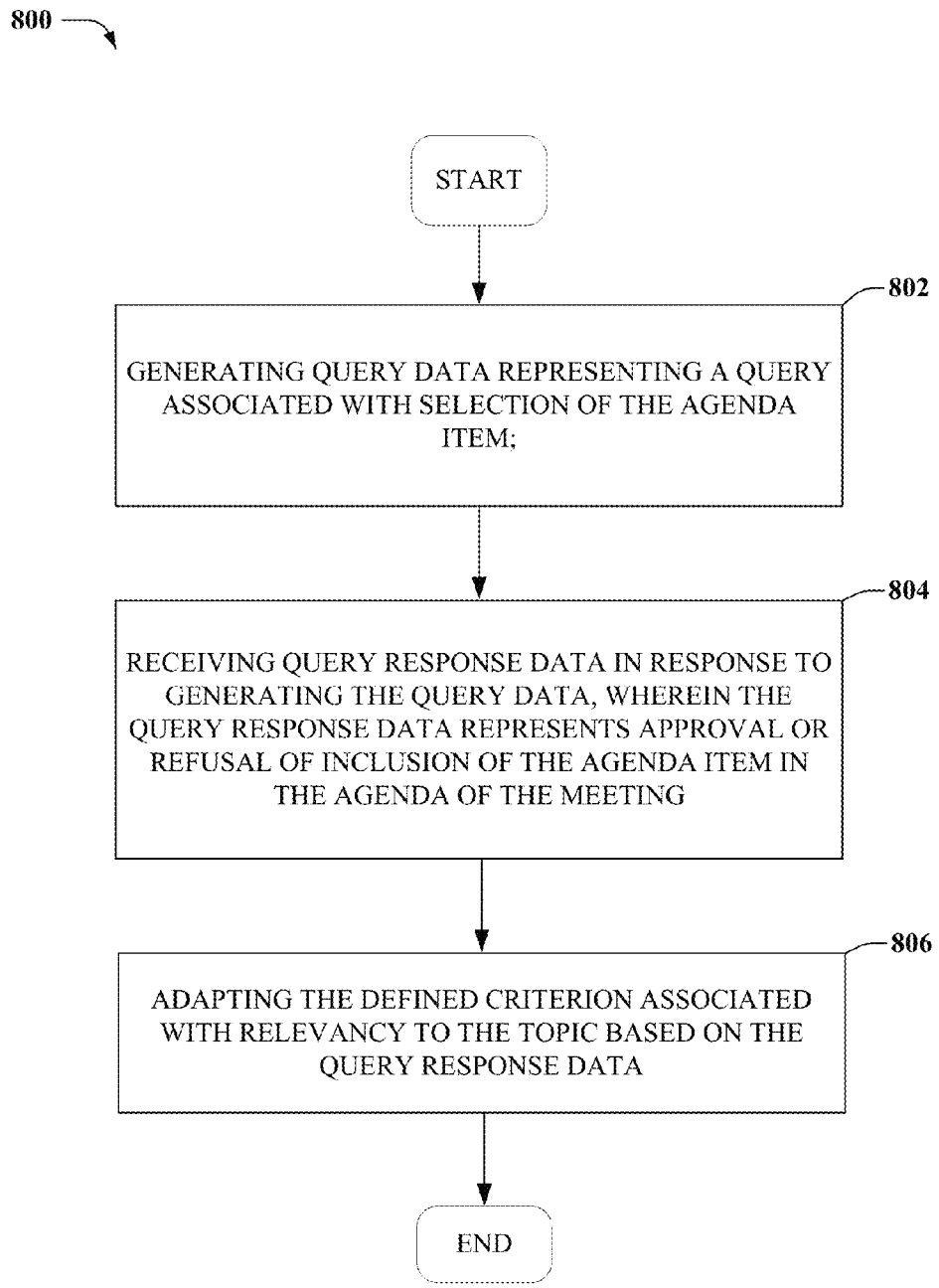
FIG. 8 illustrates a flow diagram of an example, non-limiting embodiment of a method for adapting to user feedback when generating agenda items as described herein.

FIGS. 7-8 illustrate a process in connection with the aforementioned systems. The process in FIG. 7-8 can be implemented for example by systems 100-600 as illustrated in FIGS. 1-6 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 7 illustrates a flow diagram of an example, non-limiting embodiment of a method 700 for generating agenda items as described herein. Method 700 can start at 702 where an indication that a meeting has been requested can be received by a device comprising a processor, and attendee identity data can also be received, wherein the attendee identity data is associated with the meeting. Step 704 includes determining topic data representing a topic for the meeting based on a subject of the meeting. The subject, or topic, of the meeting can be information identifying or summarizing the content of the meeting. In an embodiment, the topic or subject of the requested meeting can be determined based on the title of the meeting. If there is no title to the meeting, it can be determined based on other factors such as determining whether the meeting is related to a previous meeting. It can be determined that the meeting is related to a previous meeting based on the invitee or participant list and compare it to participants of the previous meetings.

At 706, a set of possible agenda items for the meeting are determined based on a result of an email word search associated with the topic, wherein the email search searches emails sent to and received from an attendee identity associated with the attendee identity data. At 708, agenda data can be generated representing an agenda for the meeting with an agenda item selected from the set of possible agenda items, wherein the agenda item satisfies a defined criterion associated with relevancy to the topic.

FIG. 8 illustrates a flow diagram of an example, non-limiting embodiment of a method 800 for adapting to user feedback when generating agenda items as described herein. At 802, query data is generated representing a query associated with selection of the agenda item. At 804 the method includes receiving query response data in response to generating the query data, wherein the query response data represents approval or refusal of inclusion of the agenda item in the agenda of the meeting. At 806, the method includes adapting the defined criterion associated with relevancy to the topic based on the query response data.

Figure 9:
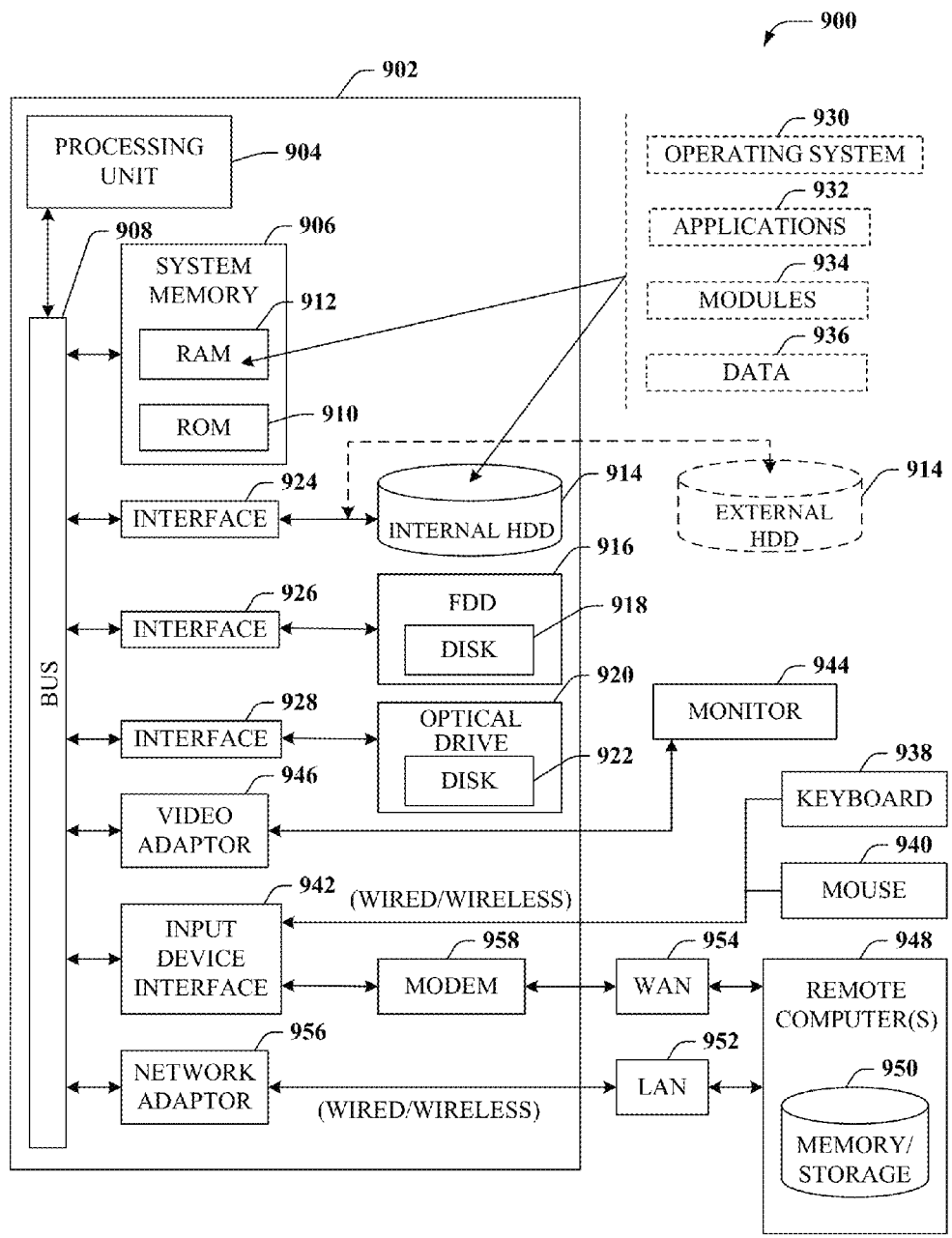
FIG. 9 is a block diagram of an example, non-limiting embodiment of a computing environment in accordance with various aspects described herein.

Referring now to FIG. 9, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), which internal hard disk drive 914 can also be configured for external use in a suitable chassis (not shown), a magnetic floppy disk drive (FDD) 916, (e.g., to read from or write to a removable diskette 918) and an optical disk drive 920, (e.g., reading a CD-ROM disk 922 or, to read from or write to other high capacity optical media such as the DVD). The hard disk drive 914, magnetic disk drive 916 and optical disk drive 920 can be connected to the system bus 908 by a hard disk drive interface 924, a magnetic disk drive interface 926 and an optical drive interface 928, respectively. The interface 924 for external drive implementations includes at least one or both of Universal Serial Bus (USB) and Institute of Electrical and Electronics Engineers (IEEE) 994 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

A user can enter commands and information into the computer 902 through one or more wired/wireless input devices, e.g., a keyboard 938 and a pointing device, such as a mouse 940. Other input devices (not shown) can include a microphone, an infrared (IR) remote control, a joystick, a game pad, a stylus pen, touch screen or the like. These and other input devices are often connected to the processing unit 904 through an input device interface 942 that can be coupled to the system bus 908, but can be connected by other interfaces, such as a parallel port, an IEEE 1394 serial port, a game port, a universal serial bus (USB) port, an IR interface, etc.

A monitor 944 or other type of display device can be also connected to the system bus 908 via an interface, such as a video adapter 946. In addition to the monitor 944, a computer typically includes other peripheral output devices (not shown), such as speakers, printers, etc.

The computer 902 can operate in a networked environment using logical connections via wired and/or wireless communications to one or more remote computers, such as a remote computer(s) 948. The remote computer(s) 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wired/wireless connectivity to a local area network (LAN) 952 and/or larger networks, e.g., a wide area network (WAN)

954. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 952 through a wired and/or wireless communication network interface or adapter 956. The adapter 956 can facilitate wired or wireless communication to the LAN 952, which can also include a wireless AP disposed thereon for communicating with the wireless adapter 956.

When used in a WAN networking environment, the computer 902 can include a modem 958 or can be connected to a communications server on the WAN 954 or has other means for establishing communications over the WAN 954, such as by way of the Internet. The modem 958, which can be internal or external and a wired or wireless device, can be connected to the system bus 908 via the input device interface 942. In a networked environment, program modules depicted relative to the computer 902 or portions thereof, can be stored in the remote memory/storage device 950. It will be appreciated that the network connections shown are example and other means of establishing a communications link between the computers can be used.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10BaseT wired Ethernet networks used in many offices.

Figure 10:
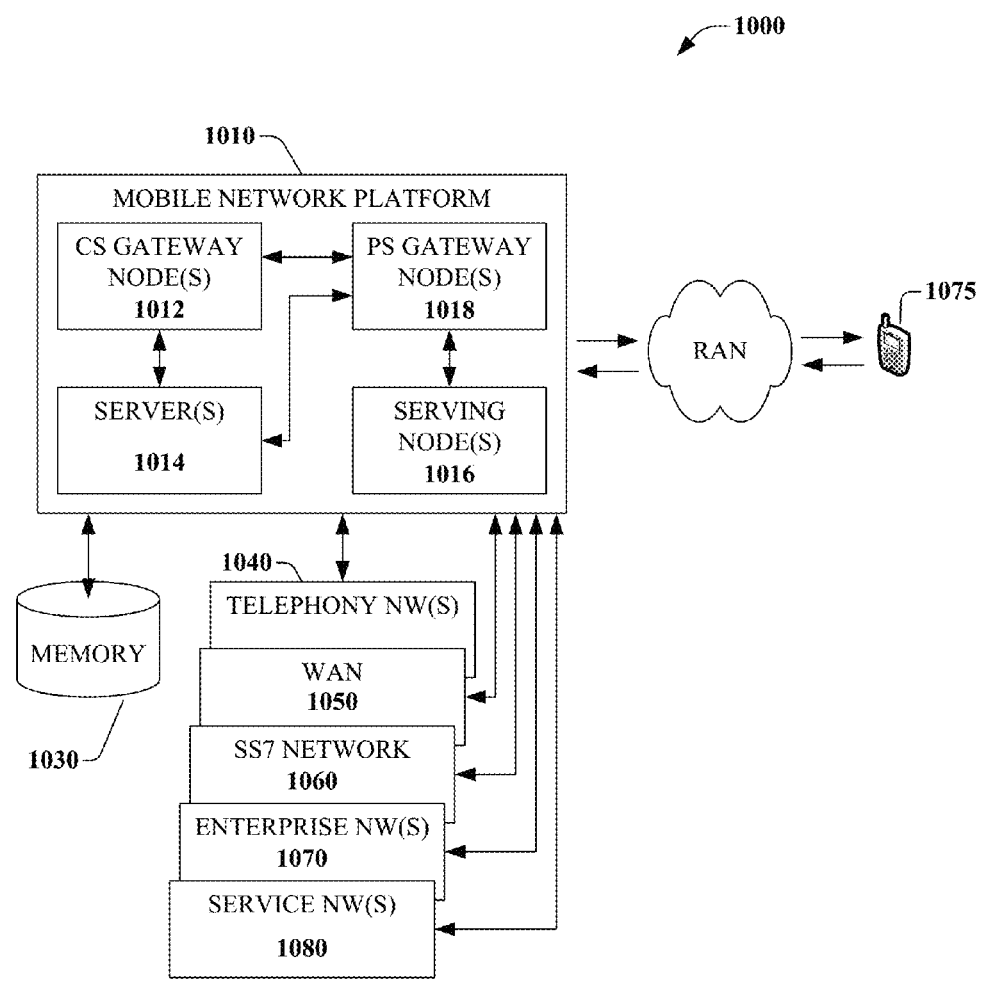
FIG. 10 is a block diagram of an example, non-limiting embodiment of a mobile network platform in accordance with various aspects described herein.

FIG. 10 presents an example embodiment 1000 of a mobile network platform 1010 that can implement and exploit one or more aspects of the disclosed subject matter described herein. Generally, wireless network platform 1010 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1010 can be included in telecommunications carrier networks, and can be considered carrier-side components as discussed elsewhere herein. Mobile network platform 1010 includes CS gateway node(s) 1012 which can interface CS traffic received from legacy networks like telephony network(s) 1040 (e.g., public switched telephone network (PSTN), or public land mobile network (PLMN)) or a signaling system #7 (SS7) network 1070. Circuit switched gateway node(s) 1012 can authorize and authenticate traffic (e.g., voice) arising from such networks. Additionally, CS gateway node(s) 1012 can access mobility, or roaming, data generated through SS7 network 1070; for instance, mobility data stored in a visited location register (VLR), which can reside in memory 1030. Moreover, CS gateway node(s) 1012 interfaces CS-based traffic and signaling and PS gateway node(s) 1018. As an example, in a 3GPP UMTS network, CS gateway node(s) 1012 can be realized at least in part in gateway GPRS support node(s) (GGSN). It should be appreciated that functionality and specific operation of CS gateway node(s) 1012, PS gateway node(s) 1018, and serving node(s) 1016, is provided and dictated by radio technology(ies) utilized by mobile network platform 1010 for telecommunication.

In addition to receiving and processing CS-switched traffic and signaling, PS gateway node(s) 1018 can authorize and authenticate PS-based data sessions with served mobile devices. Data sessions can include traffic, or content(s), exchanged with networks external to the wireless network platform 1010, like wide area network(s) (WANs) 1050, enterprise network(s) 1070, and service network(s) 1080, which can be embodied in local area network(s) (LANs), can also be interfaced with mobile network platform 1010 through PS gateway node(s) 1018. It is to be noted that WANs 1050 and enterprise network(s) 1060 can embody, at least in part, a service network(s) like IP multimedia subsystem (IMS). Based on radio technology layer(s) available in technology resource(s) 1017, packet-switched gateway node(s) 1018 can generate packet data protocol contexts when a data session is established; other data structures that facilitate routing of packetized data also can be generated. To that end, in an aspect, PS gateway node(s) 1018 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1000, wireless network platform 1010 also includes serving node(s) 1016 that, based upon available radio technology layer(s) within technology resource(s) 1017, convey the various packetized flows of data streams received through PS gateway node(s) 1018. It is to be noted that for technology resource(s) 1017 that rely primarily on CS communication, server node(s) can deliver traffic without reliance on PS gateway node(s) 1018; for example, server node(s) can embody at least in part a mobile switching center. As an example, in a 3GPP UMTS network, serving node(s) 1016 can be embodied in serving GPRS support node(s) (SGSN).

For radio technologies that exploit packetized communication, server(s) 1014 in wireless network platform 1010 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1010. Data streams (e.g., content(s) that are part of a voice call or data session) can be conveyed to PS gateway node(s) 1018 for authorization/authentication and initiation of a data session, and to serving node(s) 1016 for communication thereafter. In addition to application server, server(s) 1014 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1010 to ensure network's operation and data integrity in addition to authorization and authentication procedures that CS gateway node(s) 1012 and PS gateway node(s) 1018 can enact. Moreover, provisioning server(s) can provision services from external network(s) like networks operated by a disparate service provider; for instance, WAN 1050 or Global Positioning System (GPS) network(s) (not shown). Provisioning server(s) can also provision coverage through networks associated to wireless network platform 1010 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1075.

It is to be noted that server(s) 1014 can include one or more processors configured to confer at least in part the functionality of macro network platform 1010. To that end, the one or more processor can execute code instructions stored in memory 1030, for example. It is should be appreciated that server(s) 1014 can include a content manager 1015, which operates in substantially the same manner as described hereinbefore.

In example embodiment 1000, memory 1030 can store information related to operation of wireless network platform 1010. Other operational information can include provisioning information of mobile devices served through wireless platform network 1010, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1030 can also store information from at least one of telephony network(s) 1040, WAN 1050, enterprise network(s) 1060, or SS7 network 1070. In an aspect, memory 1030 can be, for example, accessed as part of a data store component or as a remotely connected memory store.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
a processor; and
a memory that stores executable instructions that, when executed by the processor, facilitate performance of operations, comprising:
determining subject data representing a subject for a requested meeting;
determining a group of possible agenda items for the requested meeting based on a result of an email word search associated with the subject, wherein the email search searches emails relating to an attendee identity associated with the requested meeting;
generating agenda data representing an agenda for the requested meeting with an agenda item selected from the group of possible agenda items, wherein the agenda item satisfies a defined criterion associated with relevancy to the subject, wherein the defined criterion is a function of a similarity of the agenda item to an agenda topic and an appearance frequency of the agenda item in an email associated with the requested meeting; and
determining an amount of time to dedicate to the agenda item based on an importance determined for the agenda item, wherein the importance is determined as a function of a rate of keyword occurrence, a first number of emails with the keyword occurrence, and a second number of times the agenda item appeared in previous agendas.

2. The system of claim 1, wherein the operations further comprise:
ordering agenda items based on respective amounts of time dedicated to each agenda item of the agenda items.

3. The system of claim 1, wherein the operations further comprise:
ordering agenda items based on a chronological order of appearance of the agenda items in the email word search associated with the subject.

4. The system of claim 1, wherein the operations further comprise:
determining that the requested meeting is associated with a previous meeting; and
determining the group of possible agenda items based on agenda items in the previous meeting.

5. The system of claim 4, wherein the email search searches emails sent to or received from an attendee identity associated with the previous meeting.

6. The system of claim 1, wherein the operations further comprise:
generating query data representing a query associated with selection of the agenda item.

7. The system of claim 6, wherein the operations further comprise:
receiving query response data in response to generating the query data, and wherein the query response data represents an approval of an inclusion of the agenda item in the agenda of the requested meeting.

8. The system of claim 7, wherein the operations further comprise:
in response to refusal of inclusion of the agenda item, selecting another agenda item selected from the group of possible agenda items.

9. The system of claim 7, wherein the operations further comprise:
selecting the agenda item from the group of possible agenda items based on query response data received in association with a previous meeting.

10. A method, comprising:
receiving, by a device comprising a processor, an indication that a meeting has been requested;
receiving, by the device, attendee identity data associated with the meeting;
determining, by the device, topic data representing a topic for the meeting based on a subject of the meeting;
determining, by the device, a group of possible agenda items for the meeting based on a result of an email word search associated with the topic, wherein the email search searches emails sent to and received from an attendee identity associated with the attendee identity data, and emails sent to and received from the attendee identity associated with a previous meeting;
generating, by the device, agenda data representing an agenda for the meeting with an agenda item selected from the group of possible agenda items, wherein the agenda item satisfies a defined criterion associated with relevancy to the topic, and wherein the defined criterion is a function of a similarity of the agenda item to a topic and an appearance frequency of the agenda item in an email associated with the meeting;
determining, by the device, that the requested meeting is associated with the previous meeting; and
determining, by the device, the group of possible agenda items based on agenda items in the previous meeting.

11. The method of claim 10, further comprising:
determining, by the device, an importance of the agenda item as a function of a rate of keyword occurrence, a first number of emails with the keyword occurrence, and a second number of times the agenda item appeared in previous agendas;
determining, by the device, an amount of time to dedicate to the agenda item based on the importance determined for the agenda item; and
ordering, by the device, agenda items selected from the group of possible agenda items based on a ranking of the importance determined for the agenda items.

12. The method of claim 10, further comprising:
ordering, by the device, agenda items based on a chronological order of appearance of the agenda items in the email word search associated with the topic.

13. The method of claim 10, further comprising:
determining, by the device, that the meeting is associated with the previous meeting; and
determining, by the device, the group of possible agenda items based on agenda items in the previous meeting.

14. The method of claim 10, further comprising:
generating query data representing a query associated with selection of the agenda item; and
receiving query response data in response to generating the query data, wherein the query response data represents a refusal of inclusion of the agenda item in the agenda of the meeting.

15. The method of claim 10, further comprising:
adapting the defined criterion associated with relevancy to the topic based on the query response data.

16. A computer-readable storage device storing executable instructions that, in response to execution, cause a system comprising a processor to perform operations, comprising:
receiving an indication that a meeting has been requested;
receiving attendee identity data associated with the meeting;

determining topic data representing a topic for the meeting based on a subject of the meeting;

determining a group of possible agenda items for the meeting based on a result of an email word search associated with the topic, wherein the email word search searches emails related to an attendee identity associated with the attendee identity data;

generating agenda data representing an agenda for the meeting with an agenda item selected from the group of possible agenda items, wherein the agenda item is determined to satisfy a defined criterion associated with relevancy to the topic, and wherein the defined criterion is a function of a similarity of the agenda item to a topic and an appearance frequency of the agenda item in an email associated with the meeting; and determining an amount of time to dedicate to the agenda item based on an importance determined for the agenda item, wherein the importance is determined as a function of a rate of keyword occurrence, a first number of emails with the keyword occurrence, and a second number of times the agenda item appeared in previous agendas.

17. The computer-readable storage device of claim 16, wherein the operations further comprise:
generating query data representing a query associated with selection of the agenda item; and
receiving query response data in response to generating the query data, wherein the query response data represents approval or refusal of inclusion of the agenda item in the agenda of the meeting.

18. The computer-readable storage device of claim 16, wherein the operations further comprise:
adapting the defined criterion associated with relevancy to the topic based on the query response data.

19. The computer-readable storage device of claim 16, wherein the operations further comprise:
ordering agenda items based on a chronological order of appearance of the agenda items in the email word search associated with the topic.

20. The computer-readable storage device of claim 16, wherein the operations further comprise:
selecting the agenda item from the group of possible agenda items based on query response data received in association with a previous meeting.

* * * * *